F. D. MILLIGAN.
BRAKE FOR HOUSE MOVING TRUCKS.
APPLICATION FILED MAR. 19, 1913.

1,129,413.

Patented Feb. 23, 1915.

Witnesses:
Floyd O. Chaffee,
Elmer E. Rodabaugh.

Inventor,
Frederick D. Milligan
By A. B. Bowman
Atty.

UNITED STATES PATENT OFFICE.

FREDERICK D. MILLIGAN, OF SAN DIEGO, CALIFORNIA.

BRAKE FOR HOUSE-MOVING TRUCKS.

1,129,413.  Specification of Letters Patent.  Patented Feb. 23, 1915.

Application filed March 19, 1913. Serial No. 755,275.

*To all whom it may concern:*

Be it known that I, FREDERICK D. MILLIGAN, a citizen of the United States, and a resident of San Diego, county of San Diego, and State of California, have invented certain new and useful Improvements in Brakes for House-Moving Trucks, of which the following is a specification.

My invention relates to adjustable and automatically operated brakes for house moving trucks and the principal objects of my invention are, first, to provide a brake that may be attached to any house moving truck with but slight alterations, second, to provide a brake that is automatic and positive thus reducing the liability of accidents, third, to provide a brake that will facilitate the labor of house moving, especially over rough and rolling ground, and, fourth, to provide a brake that is adjustable, economically constructed and easily operated.

Figure 1:
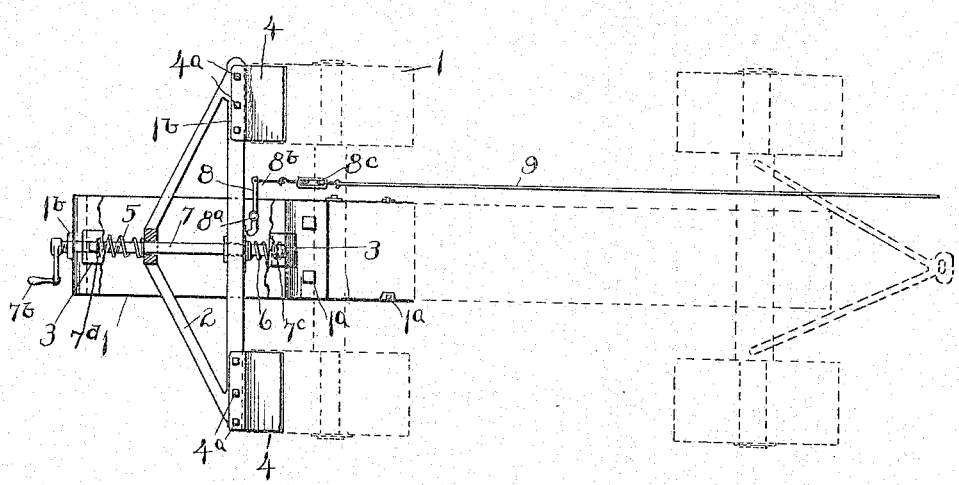
Figure 2:
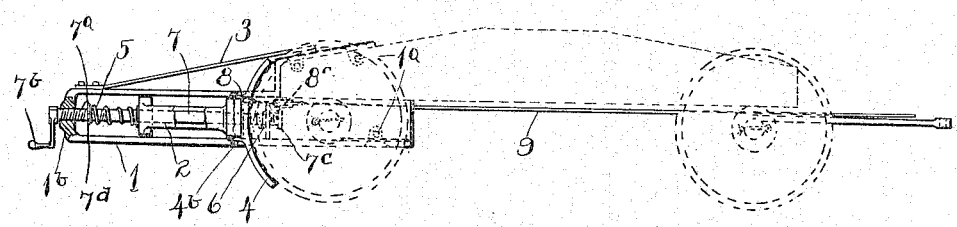

With these and other objects in view as will hereinafter appear, my invention consists of certain novel features of construction, combination and arrangement of parts as will be hereinafter described in detail and particularly set forth in the appended claims, reference being had to the accompanying drawings and to the characters of reference thereon, which form a part of this specification, in which:

Figure 1 is a plan view of my device complete attached to an ordinary house moving truck which is shown by dotted lines, and showing a portion of the brake supporting bracket broken away to facilitate the illustration, and Fig. 2 is a side elevational view thereof.

Similar characters of reference refer to similar parts throughout the several views.

The brake supporting bracket 1, brake beam 2, brace 3, brake shoe 4, cushion spring 5, release spring 6, staff 7, release lever 8 and operating cable 9, constitute the principal parts of my device.

The brake supporting bracket 1 is U shaped and it is constructed as shown and is rigidly secured to the top and bottom side of the truck body which is shown in dotted lines, by means of the bolts $1^a$; the other end of this bracket is provided with a tapped hole $1^b$ adapted for the threaded portion of the staff 7. This supporting bracket is reinforced at the top by a brace 3 which is rigidly secured at one end to the top of the truck body and at the other end to the top of the brake supporting bracket. A brake beam 2, is placed between the upper and lower edges of the brake supporting bracket 1, and is constructed as shown. At each end of this brake beam 2 is rigidly secured a brake shoe 4, which is secured thereto by means of the bolts $4^a$ passing through the lugs $4^b$. These brake shoes are adapted to conform to the outside diameter of the wheels of the truck as shown. This brake beam 2 is pivotally mounted at its center on the staff 7. This staff 7 is provided with a threaded portion $7^a$ adapted for the tapped hole $1^b$. On the extreme end of this threaded portion $7^a$ is rigidly secured a crank $7^b$ adapted to adjust the brake beam relatively to the wheels. The other end of this staff 7 is provided with a piece $7^c$ which holds the one end of spring 6 in place. Located near the edge of the brake supporting bracket 1 and between the end of the truck and the brake beam 2 is pivotally mounted on a pin $8^a$ a release lever 8, one end of which is adapted to bear on the brake beam 2, near the staff 7. The other end is provided with a short rod $8^b$ which is pivotally mounted thereto. The other end of this rod $8^b$ is attached to one end of a turn buckle $8^c$, to the other end of which is pivotally attached a cable 9, which is secured to the same pulling mechanism that is pulling the truck.

Though I have shown and described a particular detailed construction and arrangement of parts, I do not wish to be limited to this particular construction and arrangement of parts, but desire to include in the purview of my invention the principles and construction substantially as set forth in the appended claims.

It is obvious that if the cable 9 is secured to the same pulling mechanism that moves the truck when it is moving forward, the cable 9 will cause the release lever 8 to force the brake beam 2 back, thus disengaging the brake shoes from the truck wheel and allowing the truck to be moving freely, but if the said truck should start ahead faster than the speed of the pulling mechanism, there would be no strain on the release lever, and the tension spring 5 would thrust the brake beam forward applying the brake shoes to the truck wheels, thus preventing a collision between the truck and pulling mechanism, and that by shortening the distance between the washer $7^d$ and the piece $7^c$ of the staff 7 the brake beam will be forced from the wheels of the truck, thus allowing the truck to be readily moved about when not in use.

It is readily seen that with this construction there is provided a device that will obviate the necessity of blocking the wheels of the truck when going down a hill, thus avoiding the possibility of damaging the house, that there is provided a device that will facilitate the amount of labor in moving a house, that there is provided a device that can be attached to any house moving truck with but slight changes, that there is provided a device that is economically constructed, easily operated and positive in its action, that there is provided a device that will reduce the danger of accidents, that might happen in trying to block the wheels of the truck in going down an incline.

Having thus described my invention, what I claim as new and desire to secure by Letters Patent is:

1. A brake for house moving trucks comprising a U-shaped support extending horizontally from, and rigidly mounted on, the rear end of a house moving truck body, a brake beam shiftably mounted between the two horizontal members of said support, brake shoes mounted on said beam, spring and shaft means mounted in said U-shaped support and in connection with said brake beam for thrusting the brake shoes against the wheels of the truck, a lever pivotally mounted on said truck with one end engaging with said brake beam for shifting it from said position, means for adjusting the tension of said brake beam relatively to its support, and means in connection with said lever means adapted to be connected to the truck hauling means.

2. A brake for house moving trucks comprising a U-shaped support secured to the rear end of a house moving truck, and extending backwardly therefrom, a shaft provided with threads on one end engaging with the threads in a hole in the upward extending end of said U-shaped support, a handle for turning said shaft, a brake beam mounted on said shaft guided by the horizontal members of said U bar, a thrust spring on said shaft engaging with said beam tending to thrust it forward, brake shoes on said brake beam adapted to engage with the wheels on said truck, a lever pivotally mounted on said U support with one end engaging with said brake beam, and a cable attached to its other end adapted to be connected to the truck hauling means.

In testimony whereof, I have hereunto subscribed my name in the presence of two subscribing witnesses.

FREDERICK D. MILLIGAN.

Witnesses:
ABRAM B. BOWMAN,
ELMER E. RODABAUGH.

Copies of this patent may be obtained for five cents each, by addressing the "Commissioner of Patents, Washington, D. C."